(12) United States Patent
Tilton et al.

(10) Patent No.: US 6,572,723 B1
(45) Date of Patent: Jun. 3, 2003

(54) PROCESS FOR FORMING A MULTILAYER, MULTIDENSITY COMPOSITE INSULATOR

(75) Inventors: Jeffrey Allan Tilton, Louisville, KY (US); Maurice Paul Lundrigan, Prospect, KY (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 341 days.

(21) Appl. No.: 09/607,478

(22) Filed: Jun. 30, 2000

(51) Int. Cl.$^7$ ............................................... B32B 31/20
(52) U.S. Cl. .................... 156/219; 156/222; 156/309.6; 264/257; 264/327
(58) Field of Search .............................. 156/196, 219, 156/222, 221, 245, 256, 308.2, 309.6; 264/241, 257, 258, 327; 181/284, 286; 296/39.3

(56) References Cited

U.S. PATENT DOCUMENTS

| | | |
|---|---|---|
| 3,652,377 A | 3/1972 | Helmick |
| 3,752,060 A | 8/1973 | Hubert et al. |
| 3,764,454 A | 10/1973 | Healy et al. |
| 3,787,278 A | 1/1974 | Ready et al. |

(List continued on next page.)

FOREIGN PATENT DOCUMENTS

| | | |
|---|---|---|
| DE | 41 26 884 | 2/1993 |
| DE | 44 39 415 | 5/1996 |
| DE | 197 44 682 | 4/1998 |
| GB | 1421875 | 1/1976 |
| GB | 1 536 876 | 12/1978 |
| JP | 1-0060763 A | 3/1998 |
| JP | 11 180224 | 10/1999 |

*Primary Examiner*—Michael W. Ball
*Assistant Examiner*—John T. Haran
(74) *Attorney, Agent, or Firm*—Inger H. Eckert; Stephen W. Barns (57) ABSTRACT

A process for forming a multilayer composite insulator includes the steps of forming an insulator precursor by orienting an insulation insert in a desired location between a first facing layer and a polymer based blanket layer, applying differential heat to two opposing sides of the insulator precursor and applying pressure to the insulator precursor. Together, the applied differential heat and applied pressure mold the insulator precursor to a desired shape while also providing the polymer based blanket material with a first relatively high density adjacent a warmer of the two opposing sides and a zone of relatively low density adjacent the cooler of the two opposing sides. The process also includes the cooling of a molded precursor to set the insulator in the desired shape.

23 Claims, 6 Drawing Sheets

U.S. PATENT DOCUMENTS

| | | | |
|---|---|---|---|
| 3,816,233 A | * 6/1974 | Powers | 264/321 |
| 3,936,555 A | 2/1976 | Smith, II | |
| 3,975,562 A | 8/1976 | Madebach et al. | |
| 4,016,318 A | 4/1977 | DiGioia et al. | |
| 4,020,207 A | 4/1977 | Alfter et al. | |
| 4,131,664 A | 12/1978 | Flowers et al. | |
| 4,199,635 A | 4/1980 | Parker | |
| 4,242,398 A | 12/1980 | Segawa et al. | |
| 4,282,283 A | 8/1981 | George et al. | |
| 4,377,614 A | 3/1983 | Alfter et al. | |
| 4,379,801 A | 4/1983 | Weaver et al. | |
| 4,379,802 A | 4/1983 | Weaver et al. | |
| 4,395,455 A | 7/1983 | Frankosky | |
| 4,418,031 A | 11/1983 | Doerer et al. | |
| 4,432,580 A | 2/1984 | Lohmar et al. | |
| 4,539,252 A | 9/1985 | Franz | |
| 4,539,254 A | 9/1985 | O'Connor et al. | |
| 4,568,581 A | 2/1986 | Peoples, Jr. | |
| 4,579,764 A | 4/1986 | Peoples, Jr. et al. | |
| 4,711,685 A | 12/1987 | Hillman | |
| 4,729,917 A | 3/1988 | Symdra et al. | |
| 4,770,919 A | 9/1988 | Tesch | |
| 4,824,507 A | 4/1989 | D'Amico | |
| 4,888,234 A | 12/1989 | Smith et al. | |
| 4,940,112 A | 7/1990 | O'Neill | |
| 4,946,738 A | 8/1990 | Chenoweth et al. | |
| 4,948,660 A | 8/1990 | Rias et al. | |
| 4,985,106 A | 1/1991 | Nelson | |
| 5,047,198 A | 9/1991 | Kim | |
| 5,055,341 A | 10/1991 | Yamaji et al. | |
| 5,066,351 A | 11/1991 | Knoll | |
| 5,079,074 A | 1/1992 | Steagall et al. | |
| 5,094,318 A | 3/1992 | Maeda et al. | |
| 5,108,691 A | 4/1992 | Elliott | |
| 5,164,254 A | 11/1992 | Todd et al. | |
| 5,204,042 A | 4/1993 | James et al. | |
| 5,283,111 A | 2/1994 | Schlecker | |
| 5,296,657 A | 3/1994 | Gilliland et al. | |
| 5,298,319 A | 3/1994 | Donahue et al. | |
| 5,298,694 A | 3/1994 | Thompson et al. | |
| 5,376,322 A | 12/1994 | Younessian | |
| 5,436,046 A | 7/1995 | Sakamoto | |
| 5,501,898 A | 3/1996 | Fottinger et al. | |
| 5,543,193 A | 8/1996 | Tesch | |
| 5,549,776 A | 8/1996 | Juriga | |
| 5,624,726 A | 4/1997 | Sanocki et al. | |
| 5,633,064 A | 5/1997 | Ragland et al. | |
| 5,741,380 A | 4/1998 | Hoyle et al. | |
| 5,743,985 A | 4/1998 | Ernest et al. | |
| 5,744,763 A | 4/1998 | Iwasa et al. | |
| 5,749,993 A | 5/1998 | Denney et al. | |
| 5,756,026 A | 5/1998 | Sanchez et al. | |
| 5,759,659 A | 6/1998 | Sanocki et al. | |
| 5,800,905 A | 9/1998 | Sheridan et al. | |
| 5,817,408 A | 10/1998 | Orimo et al. | |
| 5,841,081 A | 11/1998 | Thompson et al. | |
| 5,872,067 A | 2/1999 | Meng et al. | |
| 5,886,306 A | 3/1999 | Patel et al. | |
| 5,932,331 A | 8/1999 | Jones et al. | |
| 5,958,603 A | 9/1999 | Ragland et al. | |
| RE36,323 E | 10/1999 | Thompson et al. | |
| 5,961,904 A | 10/1999 | Swan et al. | |
| 5,972,445 A | 10/1999 | Kimura et al. | |
| 5,975,609 A | 11/1999 | Campbell | |
| 5,979,962 A | 11/1999 | Valentin et al. | |
| 6,102,465 A | * 8/2000 | Nemoto et al. | 181/286 |

* cited by examiner

PROCESS FOR FORMING A MULTILAYER, MULTIDENSITY COMPOSITE INSULATOR

TECHNICAL FIELD AND INDUSTRIAL APPLICABILITY OF THE INVENTION

The present invention relates generally to a process for manufacturing a multilayer composite acoustical and thermal insulator which may be utilized to insulate an environment such as a passenger compartment of a vehicle from the heat and sound generated by mechanical components of that vehicle during its operation. Further uses include application in insulating appliances such as dishwashers and clothes driers and providing sound and thermal insulation for buildings including homes, offices and industrial structures.

BACKGROUND OF THE INVENTION

It is well known in the art to provide acoustical and thermal insulators on an automobile, truck or other vehicle in an effort to protect and insulate the operating or passenger compartment from the noise and heat generated by the mechanical equipment of the associated vehicle. Toward this end, mats of high temperature glass fibers have been utilized, eg. (a) on the fire wall between the dashboard and engine compartment and (b) along the floor pan of the vehicle between the passenger compartment and the drive line and exhaust system. These materials provide heat insulation which makes it possible to maintain cooler and more comfortable temperatures in the operator/passenger compartment particularly during the summer months. Additionally, these materials provide needed sound insulation, reducing or eliminating various mechanical sounds of the motor, drive train as well as the suspension and tires as the vehicle travels over the often rough and bumpy surface of the roadway.

Various methods of manufacturing or fabricating such acoustical and thermal insulators are known in the art. Examples of these methods are found, for example, in U.S. Pat. Nos. 5,055,341 to Yamaji et al. and 5,501,898 to Fottinger et al.

In the Yamaji et al. patent, woven and/or non-woven fabrics are laminated to a composite of fibers and thermal plastic resin. In the Fottinger et al. patent, a multilayer, multi-density composite is disclosed incorporating polyester fibers. The fibers are preheated in a furnace by metal plates above the melting point of the fibers. The non-woven fabric fiber layers are loaded into a molding tool and exposed to molding pressure for a dwell time sufficient to complete the molding process. The part is then cooled below the softening temperature of the fibers to set the composite in the final molded shape.

While various processes are known in the art for constructing an effective insulator, a need still exists in the art for (a) insulators providing still more enhanced acoustical and thermal insulating properties as well as (b) more reliable and economical processes for manufacturing such insulators.

SUMMARY OF THE INVENTION

In accordance with the purposes of the present invention as described herein, an improved process for manufacturing or fabricating an acoustical and thermal insulator of enhanced performance characteristics is provided. The novel process comprises the steps of forming an insulator precursor by orienting an insulation insert in a desired location between a first facing layer and a polymer based blanket layer, applying differential heat to two opposing sides of the insulator precursor and applying pressure to the insulator precursor. In this manner, the insulator precursor is molded to a desired shape while also providing the polymer based blanket layer with a first zone of relatively high density adjacent a warmer of the two opposing sides and a second zone of relatively low density adjacent a cooler of the two opposing sides. The molding process is completed by cooling the molded precursor to set the insulator in the desired shape with the first zone having a first density A and the second zone having a second density B where A>B.

The insulator precursor may be formed in a continuous operation from continuous webs of starting materials. Alternatively, the process may include the step of cutting the heat reflective material and polymer based blanket material along with the insulation insert to desired dimensions prior to the forming step.

The differential heat and pressure are applied to the insulator precursor by first and second molding elements (eg. platens, rollers). More specifically, the first molding element is heated to provide a first temperature in the first or high density zone above a softening temperature to characteristic of the polymer blanket material being processed and a second temperature in the second or low density zone below the softening temperature characteristic of the polymer blanket material being processed. Typically, the first temperature is between 200–400° F. and more typically between 200–275° F.

The pressure is applied at a level between substantially 0.5–100.0 psi for approximately 10–90 seconds and more typically approximately 15–45 seconds dwell time. Further, the method includes the compressing of the insulator precursor between approximately 10–95% and more typically 50–90% when applying the pressure in order to complete the molding process.

In accordance with yet another aspect of the present invention, the process for forming a multilayer composite insulator comprises the steps of forming an insulator precursor by orienting an insulation insert in a desired location between a first facing layer and a first and second layer of a polymer based blanket material, applying heat to two opposing sides of the insulator precursor and applying pressure to the insulator precursor so that the applied heat and applied pressure mold the insulator precursor to a desired shape. This is done to provide a first zone of relatively high density in the first layer of the polymer based blanket material and a second zone of relatively low density in the second layer of the polymer based blanket material. The process further includes the cooling of the molded precursor to set the insulator in the desired shape. Advantageously, the present process allows one to reliably and efficiently form a multilayer, multidenisity composite insulator of enhanced acoustical and/or thermal insulating properties at a reduced overall cost.

They also may have the same or different softening temperatures. If the layers have different softening temperatures, the first layer softening temperature C is typically less than the second softening temperature D.

In this process, differential heating may be utilized to heat the first and second zones. Specifically, the first molding element is heated to provide a first temperature in the first zone above a first softening temperature characteristic of the first layer of polymer based blanket material and a second temperature in a second zone below a second softening temperature characteristic of the second layer of polymer based blanket material.

The first temperature is typically between about 200–400° F. and still more typically between about 300–375° F. Pressure is applied at a level between substantially 0.5–100.0 psi typically for approximately 5–45 and more typically 5–20 seconds. The insulator precursor is compressed between about 50–95% and more typically between 75–90%.

Still other objects of the present invention will become apparent to those skilled in this art from the following description wherein there is shown and described preferred embodiments of this invention, simply by way of illustration of several of the modes best suited to carry out the invention. As it will be realized, the invention is capable of other different embodiments and its several details are capable of modification in various, obvious aspects all without departing from the invention. Accordingly, the drawings and descriptions will be regarded s illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiments of the invention, examples of which are illustrated in the accompanying drawing.

DETAILED DESCRIPTION AND PREFERRED EMBODIMENTS OF THE INVENTION

Figure 1A:
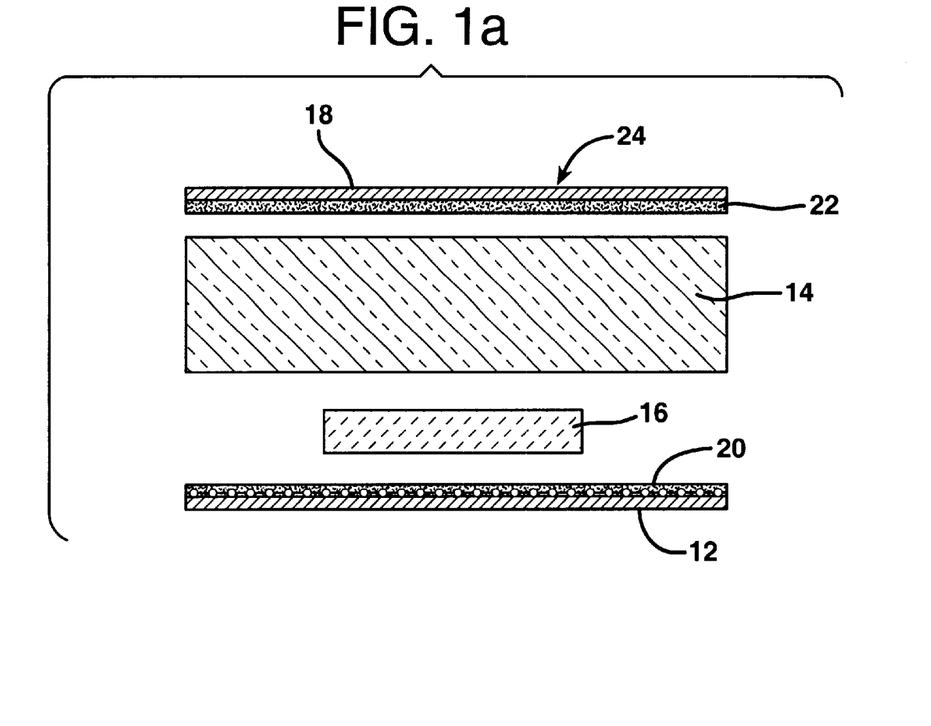
FIGS. 1a–1d schematically illustrate a first embodiment of the process of the present invention.
Figure 1B:
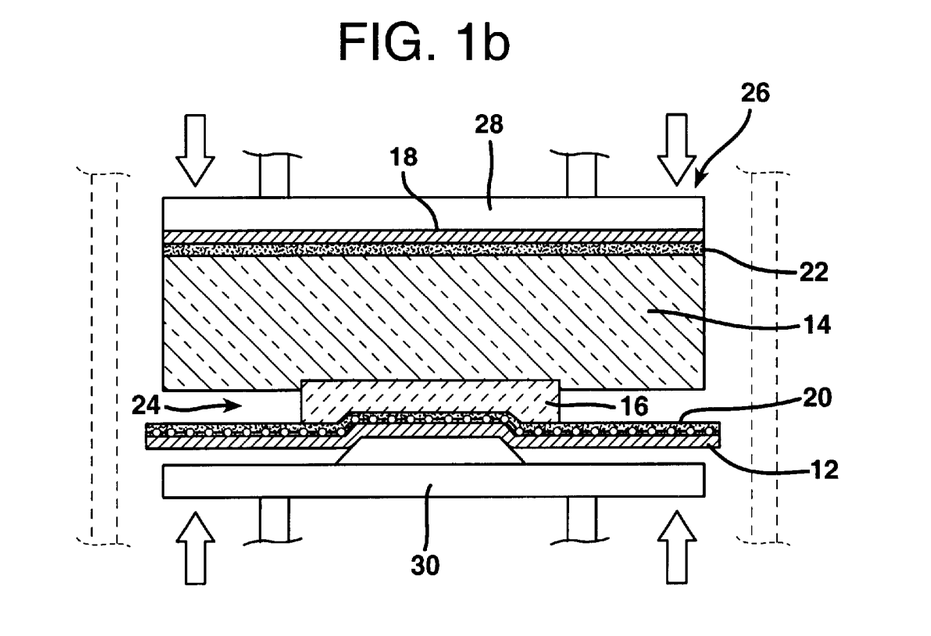
Figure 1C:
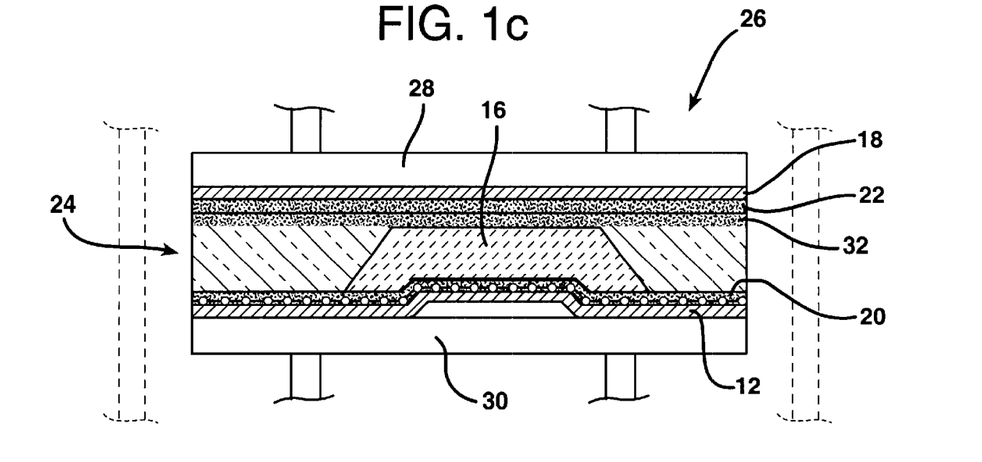
Figure 1D:
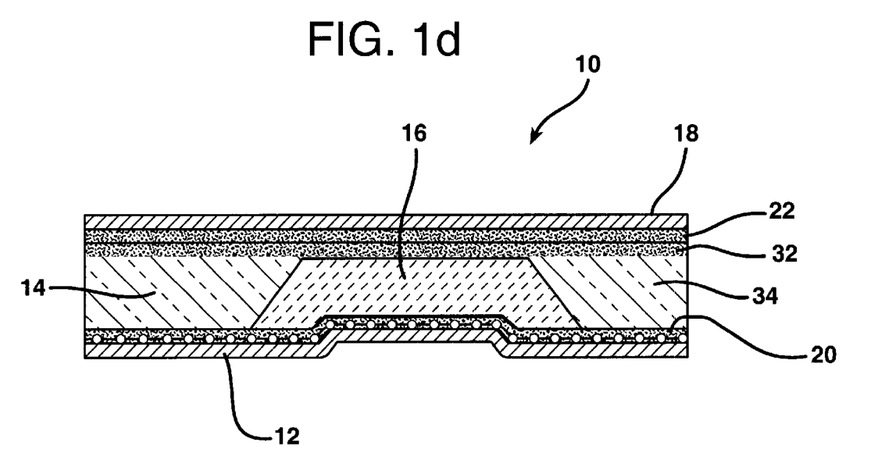

Reference is now made to FIGS. 1a–d which schematically illustrate a first embodiment of the process of the present invention for forming a multilayer composite insulator generally designated by reference numeral 10. As shown in FIG. 1d, the multilayer composite insulator 10 includes a first facing layer 12, a polymer based blanket layer 14, an insulation insert 16 and a second facing layer 18.

The first facing layer 12 may be made from polyester, polypropylene, rayon, nylon, glass and any combination thereof. In applications requiring superior heat insulative characteristics, the facing layer 12 may be formed from a heat reflective material such as a metallic foil (eg. aluminum or other heat reflective metal). Where a metallic foil is used foil thickness is generally in the range of 0.5–5.0 mil. In most applications, a foil thickness of between substantially 0.5–2.0 mil (e.g. 1.0 mil) is used. The thickness selected is based upon the temperature, durability and structural requirements of the particular product application.

The first facing layer 12 may be reinforced or non-reinforced.

Reinforcements are included to add durability and structural integrity. Reinforcements may take the form of fibrous scrims, fibrous mats or fibrous webs. For many applications, the reinforcement is made from a relatively strong fiber such as fiberglass. Typically, glass fiber threads are arranged in a criss-cross pattern. The number of threads per inch can be adjusted to provide the desired product properties. The fiber reinforcement strands are regularly spaced across the web and cross-web directions of the foil.

Typically, spacing patterns include but are not limited to 4×4 (four strands per inch in both directions), 3×3, 2×2, 4×2 and 3×2. Typical patterns are rectangular and diamond. The strands may be materials other than glass which provide the desired properties (e.g. polyester).

Alternative reinforcement materials for the foil layer 12 include but are not limited to glass mats, polymer mats and blended mats. The reinforcement may be preattached to the metallic foil. Alternatively loose laid reinforcement may be utilized. In most applications, the foil layer reinforcement provides improved tear resistance, strength and/or acoustical insulating properties. However, in many applications, it should be appreciated that no reinforcement is necessary.

The first facing layer 12 (reinforced or non-reinforced) is attached to the polymer based blanket layer 14 and/or the insulation insert 16 by means of a heat activated adhesive 20. The adhesive 20 utilized may be a thermoplastic sheet or thermoplastic web material that tends to melt and flow at temperatures between 200–350° F. Adhesives 20 of this type are desirable because they can be activated during the molding phase of production. Besides thermoplastic sheets and webs, adhesives 20 such as hot melts, latex and various heat activated resins may be utilized. The adhesive 20 may be a separate layer as illustrated or the adhesive may already be attached to the first facing layer 12 in a dot matrix (i.e. uniform) or sintered (i.e. random) pattern.

The polymer based blanket layer 14 must exhibit the thermal and acoustical properties necessary for the finished product to perform to the requirements of its particular application. Generally, the polymer based blanket layer 14 is made from polyester fiber mat or a polyester fiber mat blend. Other materials that may be utilized include mats of polyolefins, polyethylene, cotton shoddy, nylon, rayon, acrylic, natural fibers (eg. kenaf, hemp) and combination thereof with or without melt blown microfibers. Such mats generally have a density of between 25–200 g/ft$^2$ and more typically 50–150 g/ft$^2$ and still more typically 75–125 g/ft$^2$.

The insulation insert 16 is provided to furnish extra thermal and/or acoustical insulation over sources of high heat and/or high sound commonly associated with various operating systems of the vehicle. Materials that my be used for the insert 16 include but are not limited to fiberglass, high temperature foams, polymer based blanket products, natural fiber based blanket products and combinations thereof. In order to reduce the thickness or bulk of the insulator 10, increase its flexibility for ease of installation and also lower production costs, the insert 16 is sized and positioned in the insulator at one or more selected locations only in order to provide shielding of (a) heat sources which produce hot spots requiring extra thermal protection and/or (b) sound transmitting or generating components that are sources of strong sounds which might otherwise annoy the operator and passengers of the vehicle.

For many applications, strong thermal insulating properties are an essential characteristic of the insert 16. For these applications, the material utilized for the insert 16 must not produce smoke when exposed to temperatures as high as 450° F. Materials such as fiberglass and some higher temperature foams are ideal for such an application. Layered composite materials may also be utilized. Even a secondary layer of foil or like heat reflective material may be utilized as long as the material is capable of dissipating heat and/or acoustical energy from localized areas in the insulator 10.

The second facing layer 18 provides a smooth durable surface for mounting the insulator 10 against a vehicle component such as a fire wall, fender well, drive shaft tunnel or passenger compartment floor pan. A number of readily available materials may be utilized to construct the second facing 18. Such materials include polyester, polypropylene, rayon, nylon, glass, metal foil and any combinations thereof (eg. polyester/rayon). Both the first and second facing layers 12, 18 may also be treated to provide enhancement of desirable properties. Accordingly, the facing layers 12, 18 may be chemically treated, for example, with moisture barriers, flame retardants, biocides and colorants (eg. dark gray or black). The second facing layer 18 may have a weight of 0.25 to 3.0 oz/yd$^2$ (eg. 1.25 oz/yd$^2$).

While not specifically shown, the second facing layer 18 may be reinforced with a scrim of a type similar to that described above with respect to the first facing layer 12. Appropriate adhesives 22 for securing the scrim (if any) and the second facing layer 18 together and to the polymer based blanket 14 include thermoplastic films and webs of polyethylene, polypropylene, polyester, polyamides and combinations thereof. The adhesive 22 may be a separate layer or already attached to the facing layer 18 in a dot matrix (i.e. uniform) or sintered (i.e. random) pattern. Alternatively, a hot melt adhesive or a latex adhesive may be utilized.

FIG. 1a shows the forming of an insulation precursor 24. This is accomplished by orienting an insulation insert 16 at a desired location between a first facing layer 12 and a layer of the polymer based blanket material 14. While not required in the final product, FIG. 1a also shows the second facing layer 18 including its adhesive layer 22. While FIG. 1 shows the first facing layer 12, polymer based blanket layer 14, insulation insert 16 and second facing layer 18 all being cut to desired dimensions prior to forming, it should also be appreciated that the present process may is be continuous with the heat reflective layer 12, polymer based blanket layer 14 and facing layer 18 (if present) each being fed in desired lengths from a continuous supply of material into the molding equipment.

Altogether, the first facing layer 12, polymer based blanket layer 14, insulation insert 16 and second facing layer 18 form an insulation precursor 24. As shown in FIG. 1b, the insulation precursor 24 is fed or placed into a molding press generally designated by reference numeral 26. The molding press 26 includes a first molding element 28 and a second, cooperating molding element 30. As illustrated, the molding elements 28, 30 take the form of platens. It should be appreciated, however, that the molding elements 28, 30 may take any appropriate form known in the art including not only platens, but also rollers and any combination of such structures.

The first molding element or platen 28 is heated to provide a first temperature above the softening temperature characteristic of the polymer blanket material. The second molding element or platen 30 is heated to a temperature below the softening temperature characteristic of the polymer blanket material 14. Typically, the first temperature is between 200–400° F. and more particularly between 200–275° F. Typically, the second temperature is less than 200° F. and more typically less than 100° F.

As shown in FIG. 1c, the platens 28, 30 are closed on the insulation precursor 24. In this way, both differential heat and pressure are applied to two opposing sides of the insulation precursor 24. The pressure is typically applied at a level between substantially 0.5–100.0 psi for approximately 10–90 seconds and more typically 15–45 seconds. As a result, the insulation precursor 24 is compressed between approximately 10–95% and more typically between 50–90%. The applied pressure and resulting compression vary over the surface of the insulator precursor 24 depending upon the shape of the platens, the gap width between the platens and the thickness of the precursor at any given point.

This technique functions to heat a first zone 32 of the polymer based blanket 14 so as to soften the polymer binding fibers adjacent the first, relatively hot molding element 28. The polymer binding fibers in a second zone 34 adjacent the relatively cool second platen 30 are not softened. When this occurs in the mold with the insulator precursor 24 under compression, the fibers in the first zone 32 are reshaped into a higher density layer. The fibers in the second zone 34 are not softened and, therefore, when the pressure is removed the second zone generally retains its original thickness and density characteristics. The thickness of the first zone 32 or high density layer and, accordingly, the overall thickness of the final insulator 10 is controlled by the temperature of the first platen 28, the level of pressure and therefore the amount of compression to which the precursor 24 is subjected and by the length of time that pressure and compression are provided.

Once the insulated precursor 24 is subjected to appropriate differential heating, pressure and compression to yield the desired end product, at least the first molding platen 28 and more often both platens 28, 30 are cooled in order to cool the polymer fibers in the first zone 32 below their softening temperature. The pressure is then removed as the platens 28, 30 are opened. When this is done, the fist zone 32 of the polymer based blanket layer 14 maintains its relatively high density character whereas the second zone 34 of the polymer based blanket layer 14 returns substantially to its original relatively low density character. As a result, the insulator precursor 24 is transformed into the insulator 10 of two different density zones simultaneously with molding to a desired shape: that is, the first zone has a first density A while the second zone has a second density B where A>B.

Advantageously, the relatively high density zone 32 provides a tough, outer "crust" that increases the rigidity of the insulator and functions to protect the blanket layer 14 from damage both during installation on a vehicle as well as after it is in place. The second zone 34 of relatively low density material provides enhanced insulative properties that better shield undesirable heat and/or noise from, for example, the operator/passenger compartment of a vehicle upon which the insulator 10 is installed. Of course, other high density and low density section or zone layered arrangements may be provided strictly depending upon what is most appropriate for a particular application.

Figure 2A:
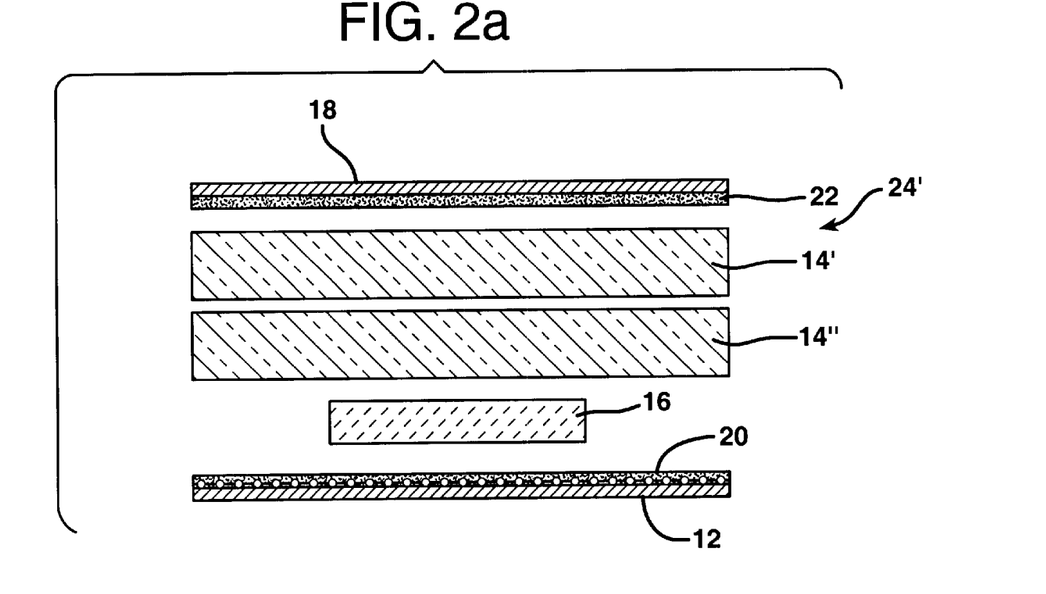
FIGS. 2a–2d schematically illustrate a second embodiment of the process of the present invention.

FIGS. 2a–2d demonstrate a process very similar to that described above with respect to the process illustrated in FIGS. 1a–1d. The only difference is that the polymer based blanket layer 14 comprises two separate layers 14' and 14" identified as the first and second layer of polymer based blanket material. As shown in FIG. 2a, the insulator precursor 24' of this embodiment is formed from the first facing layer 12, the first and second layers 14', 14" of polymer based blanket material, the insulation insert 16 and the second facing layer 18. As shown, the insulation insert 16 is positioned between the polymer based blanket layer 14" and the first facing layer 12. It should be appreciated, however, that the insulation insert 16 could be positioned between the two polymer based blanket layers 14', 14" if desired.

Figure 2B:
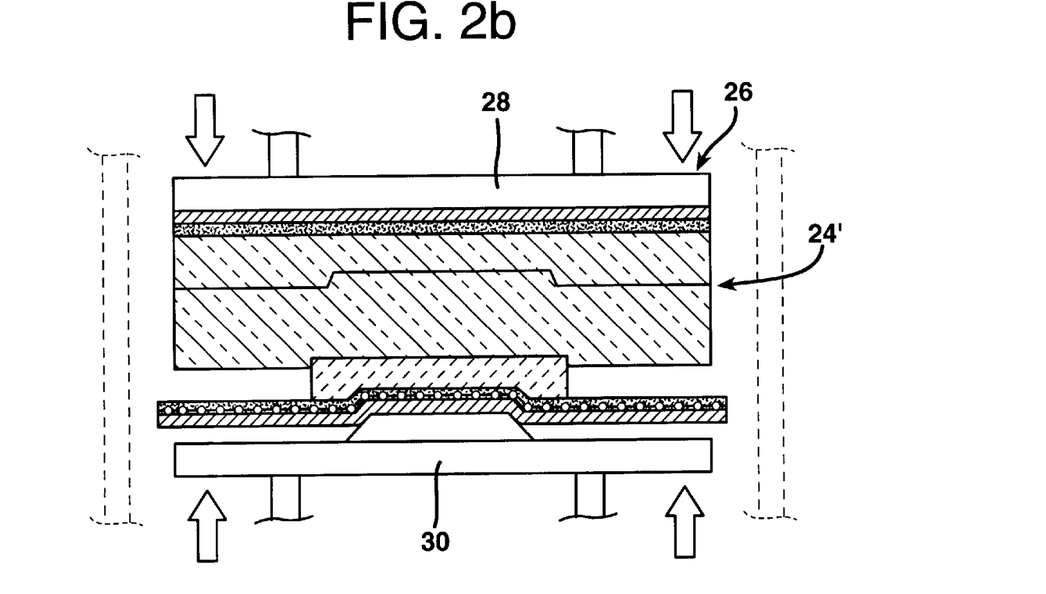
Figure 2C:
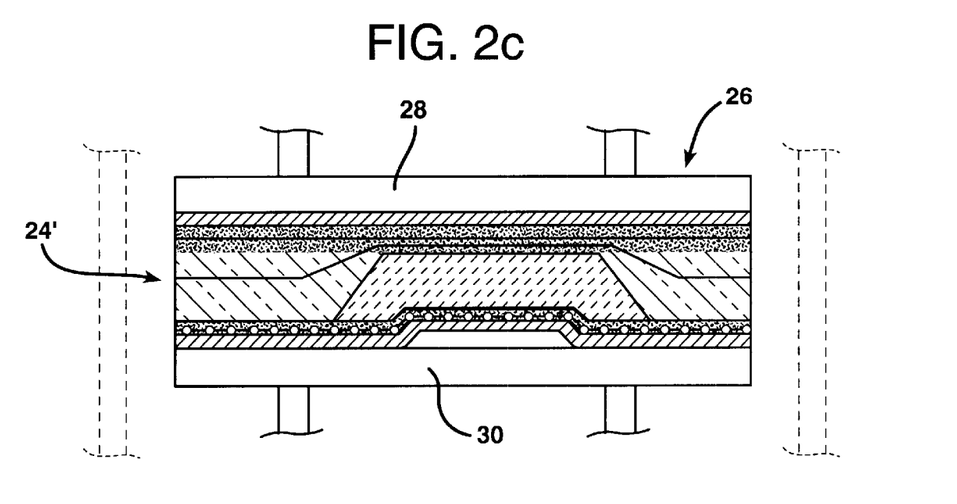
Figure 2D:
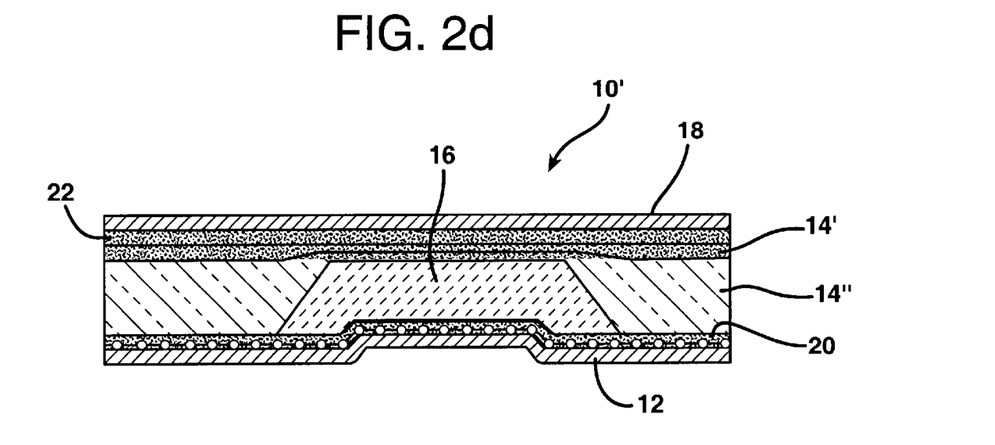

As illustrated in FIGS. 2b and 2c, the insulator precursor 24' is processed in the same manner as described above with respect to the insulation precursor 24 in order to produce the insulator 10' (note FIG. 2d). However, in this approach the polymer binding fibers in the two layers 14', 14" have significantly different softening points or temperatures since each layer utilizes a different softening point polymer fiber: that is, the first layer 14' has a first softening point temperature C while the second layer 14" has a second softening temperature D where C<D. Typically, differential heating and pressure are then applied in order to compress the insulator precursor 24' to a given gap width for a given length of time and to a given temperature. More specifically, during processing, a pressure of between 0.5–100 psi is applied for between about 5–45 and more typically 5–20 seconds to the insulator precursor 24' in order to produce a compression thereof between about 50–95% and more commonly 75–90%.

In this method, the layer 14' with the lower softening point polymer binding fiber is placed next to the relatively hot platen 28 and the layer 14" with the higher softening point binding fiber is placed next to the relatively cool platen 30. The hot platen 28 is run at a temperature that is hot enough to activate the lower softening point binding fiber in the layer 14' but not the higher softening binding fiber in the layer 14". This first temperature is typically between about 200–400° F. and more typically 300–375° F. When compression occurs, a high density zone is formed from the layer 14' of lower softening point binding fiber while the layer 14" of higher softening point binding fiber is unaffected. Accordingly, after the necessary cooling to bring the lower softening point binding fibers in the layer 14' above the softening temperature and the opening of the platens 28 and 30, the insulator 10' retains a relatively high density zone formed from the layer 14' and a relatively low density zone formed from the layer 14". Since the blanket layers 14', 14" are initially of a selected thickness and density, the overall thickness of the insulator 10', the thickness and density of the high density zone or layer 14' and the thickness and density of the low density layer may all be well controlled.

While the process illustrated in FIGS. 2a–2d has been described as incorporating a differential heating step, it should be appreciated that when certain polymer binding fibers with a relatively large separation in their softening points are selected for the two layers 14', 14", differential heating may not be necessary. In this situation, the platens 28 and 30 are both heated to a temperature above the softening point of the polymer binding fibers in the layer 14' and below the softening point of the polymer binding fibers in the layer 14". In this way, it is still possible to obtain a high density zone from the polymer binding fibers in the layer 14' and a relatively low density zone from the polymer binding fibers in the layer 14".

Figure 3A:
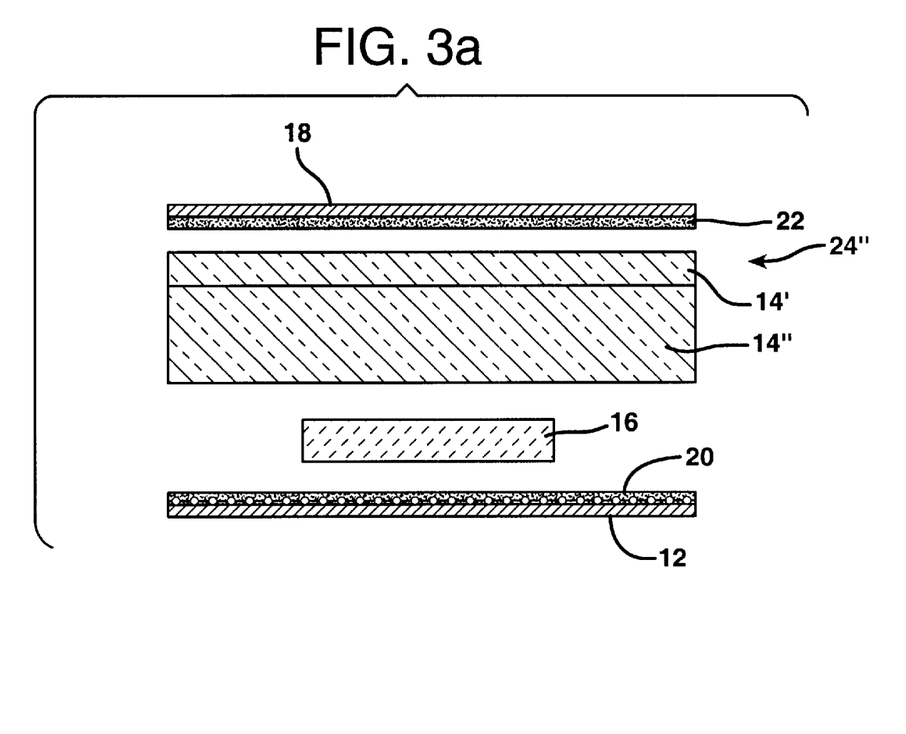
FIGS. 3a–3d schematically illustrate a third embodiment of the process of the present invention.
Figure 3B:
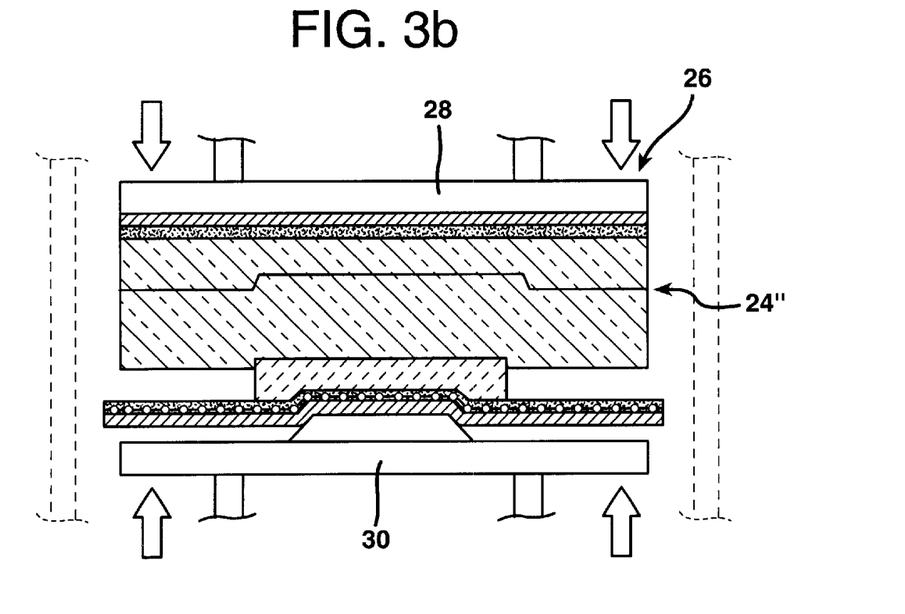
Figure 3C:
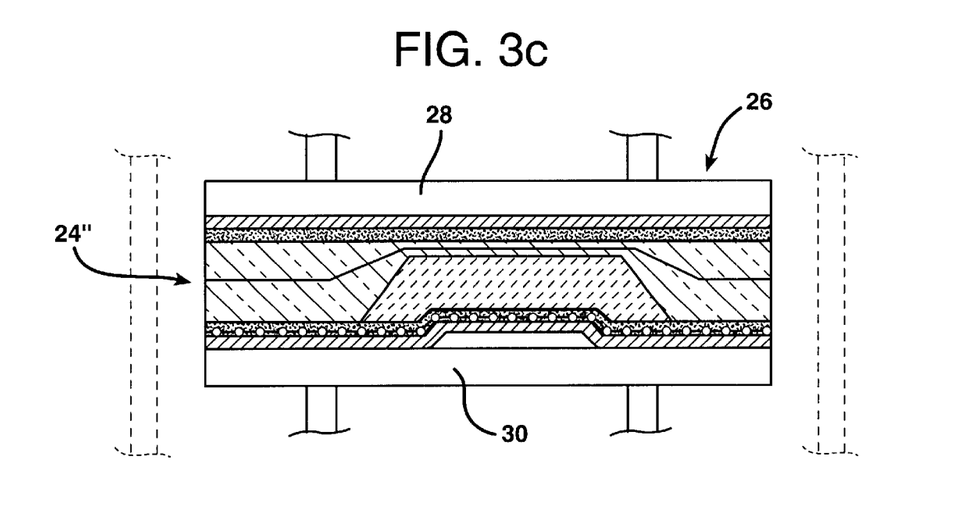
Figure 3D:
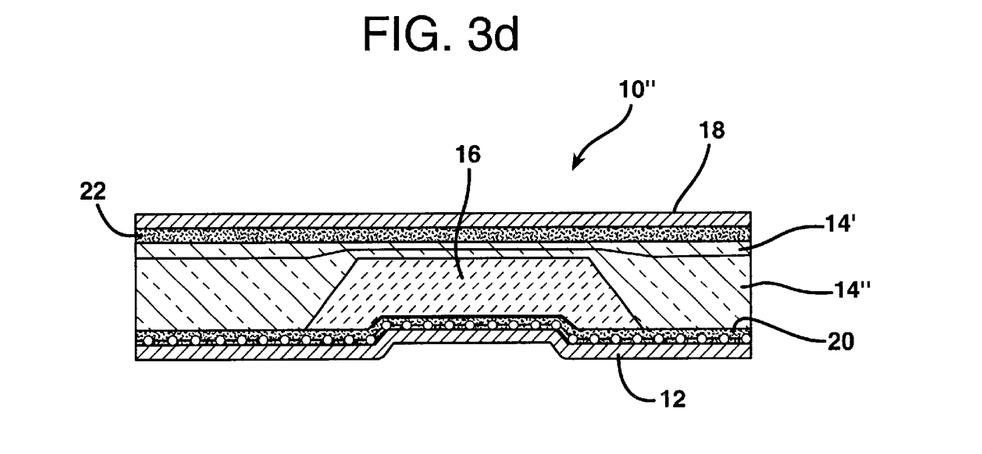

Yet another embodiment of the present process is shown in FIGS. 3a–3d. In this embodiment, the insulator precursor 24" is formed from a first facing layer 12, a polymer based blanket material 14 including two composite layers 14', 14", an insulation insert 16 and a second facing layer 18. In this embodiment, the polymer based blanket material 14 has been preformed to incorporate both the lower softening point polymer binding fiber layer 14' and the higher softening point polymer binder fiber layer 14". This may be achieved by feeding the higher melting point polymer binding fiber layer 14' back through the forming oven during the formation of the lower softening point polymer binding fiber layer 14'. Since the forming oven would be running at a temperature cooler than that required to activate the higher softening point polymer binding fiber, the layer 14" would undergo compression in the oven but substantially retain its original thickness in density after exiting the oven. As illustrated in FIGS. 3b–3d, the resulting insulator 10" is otherwise processed in the same manner as described above with respect to the insulator 10' shown in FIG. 2d.

In yet another embodiment of the present process the insulator precursor 24" of FIG. 3d is formed with a polymer based blanket material 14 formed from two composite layers 14', 14" preformed with different densities but having identical polymer binding fiber softening points. Processing in accordance with the present method allows molding of the insulator 10" to a desire shape while maintaining and/or further developing the differential density characteristics of the layers 14', 14".

The foregoing description of preferred embodiments of the invention has been presented for purposes of illustration and description. It is not intended to be exhaustive or to limit the invention to the precise form disclosed.. Obvious modifications or variations are possible in light of the above teachings for example, one or both facings could be preattached to the polymer based blanket prior to molding. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for forming a multilayer composite insulator, comprising:
    forming an insulator precursor by orienting an insulation insert in a desired location between a first facing layer and a polymer based blanket layer;
    applying differential heat to two opposing sides of said insulator precursor;
    applying pressure to said insulator precursor whereby said applied differential heat and said applied pressure mold said insulator precursor to a desired shape while also providing said polymer based blanket material with a first zone having a first density A adjacent a warmer of said two opposing sides and a second zone having a second density B adjacent a cooler of said two opposing sides where A>B; and
    cooling said molded precursor to set said insulator in the desired shape.

2. The process of claim 1 further including cutting said first facing layer, said polymer based blanket layer and said insulation insert to desired dimensions prior to said forming.

3. The process of claim 1, wherein said differential heat and said pressure are applied by first and second molding elements and wherein said first molding element is heated to provide a first temperature in said first zone above a softening temperature characteristic of said polymer based blanket layer and a second temperature in said second zone below said softening temperature characteristic of said polymer based blanket layer.

4. The process of claim 3, wherein said first temperature is between 200–400° F.

5. The process of claim 3, wherein said first temperature is between 200–275° F.

6. The process of claim 1, wherein said pressure is applied at a level between substantially 0.5–100.0 psi.

7. The process of claim 6, wherein said pressure is applied for approximately 10–90 seconds.

8. The process of claim 6, wherein said pressure is applied for approximately 15–45 seconds.

9. The process of claim 1, including compressing said insulator precursor between approximately 10–95% when applying said pressure.

10. The process of claim 1, including compressing said insulator precursor between approximately 50–90% when applying said pressure.

11. The process of claim 1, including orienting a second facing layer with said insulation insert, said first facing layer and said polymer based blanket layer when forming said insulator precursor.

12. The process of claim 1 further including making said polymer based blanket layer from a material selected from a group consisting of polyester, polyolefin, polyethylene, cotton shoddy, nylon, rayon, acrylic, natural fibers and combinations thereof with or without meltblown microfibers.

13. A process for forming a multilayer composite insulator, comprising:

forming an insulator precursor by orienting an insulation insert in a desired location (a) between a first facing layer and a first layer of a polymer based blanket material having a first softening temperature C or (b) between said first layer of a polymer based blanket material and a second layer of a polymer based blanket material having a second softening temperature D where C<D;

applying heat to two opposing sides of said insulator precursor so as to soften said first layer of polymer based blanket material without softening said second layer of polymer based blanket material;

applying pressure to said insulator precursor whereby said applied heat and said applied pressure mold said insulator precursor to a desired shape while also simultaneously providing a first zone having a first density A in said first layer of said polymer based blanket material and a second zone having a second density B in said second layer of said polymer based blanket material where A>B; and cooling said molded precursor to set said insulator in the desired shape.

14. The process of claim 13 further including cutting said first facing layer, said first and second layers of polymer based blanket material and said insulation insert to desired dimensions prior to said forming.

15. The process of claim 13 including utilizing differential heating of said first and second zones wherein a first molding element is heated to provide a first temperature in said first zone above said first softening temperature C characteristic of said first layer of said polymer based blanket material and a second temperature in said second zone below said second softening temperature D characteristic of said second layer of said polymer based blanket material.

16. The process of claim 15, wherein said first temperature is between 200–400° F.

17. The process of claim 15, wherein said first temperature is between 300–375° F.

18. The process of claim 13, wherein said pressure is applied at a level between substantially 0.5–100.0 psi.

19. The process of claim 18, wherein said pressure is applied for approximately 5–45 seconds.

20. The process of claim 19, wherein said pressure is applied for approximately 5–20 seconds.

21. The process of claim 13, including compressing said insulator precursor between approximately 50–95% when applying said pressure.

22. The process of claim 13, including compressing said insulator precursor between approximately 75–90% when applying said pressure.

23. The process of claim 13, including orienting a second facing layer with said insulations insert, said first facing layer and said first and second layers of polymer based blanket material when forming said insulator precursor.

* * * * *